United States Patent [19]

Goodman

[11] 4,401,060
[45] Aug. 30, 1983

[54] FLUID INJECTION SYSTEM FOR A SUPERCHARGED INTERNAL COMBUSTION ENGINE

[75] Inventor: Toronta P. Goodman, Summit Point, W. Va.

[73] Assignee: Goodman System Company, Inc., Armonk, N.Y.

[21] Appl. No.: 333,450

[22] Filed: Dec. 23, 1981

[51] Int. Cl.³ .................... F02D 19/00; F02M 25/02
[52] U.S. Cl. .................. 123/25 R; 123/25 M; 123/25 J; 123/25 A
[58] Field of Search .............. 123/25 R, 25 A, 25 L, 123/25 M, 25 N, 25 J, 25 K, 198 A; 261/18 A

[56] References Cited

U.S. PATENT DOCUMENTS

| | | |
|---|---|---|
| 2,431,590 | 11/1947 | Smith . |
| 2,447,793 | 8/1948 | Bolt et al. . |
| 2,475,156 | 7/1949 | Schorn . |
| 2,530,139 | 11/1950 | Wiegand et al. . |
| 2,546,901 | 3/1951 | Mock . |
| 2,548,150 | 4/1951 | Fox . |
| 2,586,004 | 2/1952 | Chamberlin . |
| 3,196,603 | 7/1965 | Cholvin et al. ............... 60/13 |
| 3,911,871 | 10/1975 | Williams et al. ............ 123/25 K |
| 3,930,470 | 1/1976 | Douglas ..................... 123/25 A |
| 4,016,837 | 4/1977 | Wentworth ................. 123/25 R |
| 4,069,794 | 1/1978 | Jordan ....................... 123/25 A |
| 4,096,829 | 6/1978 | Spears ....................... 123/25 L |

Primary Examiner—Ira S. Lazarus

[57] ABSTRACT

A system for injecting fluid into an internal combustion engine, in which a carburetor supplies an air/fuel mixture to the engine in response to the demand on the engine, and a nozzle receives the fluid and a portion of the mixture and injects the fluid and the mixture into the carburetor at a rate proportional to the flow rate of the mixture. A supercharger receives the mixture from the carburetor and increases the pressure and flow rate of the mixture in response to a predetermined demand on the engine before the mixture is introduced to the engine.

13 Claims, 4 Drawing Figures

FLUID INJECTION SYSTEM FOR A SUPERCHARGED INTERNAL COMBUSTION ENGINE

BACKGROUND OF THE INVENTION

The present invention relates to a system for injecting a fluid, such as water or a water solution, into a supercharged internal combustion engine.

Various cooling fluids, such as water and water in solution with other substances, such as alcohols, including methanol, ethanol, etc., have been commonly injected into hydrocarbon engines, both of the spark-ignition and compression-ignition type, to provide improved engine operation. These improvements are possible since, during the compression stroke of the engine, the water droplets evaporate and thus absorb heat and prevent pre-ignition. On the power stroke, as the gasoline is burned the remaining water droplets and vapor are turned to steam which absorbs more heat and helps prevent detonation and the formation of nitrous oxides. Also, as the water turns to steam, it undergoes considerable expansion which produces significant additional power. Further, combustion occurs at lower temperatures and is more even, and the pistons and valves enjoy a longer life. Still further, the presence of water also creates a "steam cleaning" process that tends to remove carbon and other deposits from the combustion chamber, as well as prevent the formation of additional deposits.

Various types of prior art devices have been used to introduce cooling fluids into internal combustion engines. These devices have included nozzle-type injectors in which the fluid is pumped directly into the engine and intake air humidifiers in which air is passed through a volume of water before being introduced into the engine. However, since the injection of a relatively low volume of fluid is desired when compared to the volume of fuel introduced into the engine, it is difficult, if not impossible, to meter the fluid with the precision needed to insure optimum performance when it is pumped directly into the engine. Also, if humidified air is used, there is a reduction in power and fuel economy since the humidified air is less dense than an equal volume of dry air with water droplets. Also, the use of humidified air does not permit the cooling effect caused by the evaporation of the water droplets.

The use of supercharged engines, in which air is supplied to the engine intake at a relatively high pressure to increase the air charge weight and the power output of the engine, has long been recognized, especially in the high performance field. The use of superchargers has further highlighted the advantages of injecting cooling fluids into the engine since, for example, the adiabatic compression of the intake air by the supercharger raises the air charge temperature and therefore promotes detonation in the engine. However, the aforementioned prior art technique of pumping a stream of unatomized water directly into the carburetor, and therefore into the supercharger to reduce the temperature is unsatisfactory since the relatively heavy, unatomized water impinges on the impeller blades of the supercharger and causes corrosion and premature failure of the blades.

SUMMARY OF THE INVENTION

It is therefore an object of the present invention to provide a system for injecting a fluid, such as water or a water solution, into the air intake side of a supercharged internal combustion engine in response to increased demands on the engine to obtain a precise metering of the injected fluid.

It is still another object of the present invention to provide a fluid injection system of the above type in which a portion of the air/fuel mixture from the supercharger is introduced to a nozzle which injects the fluid into the engine in proportion to the flow of the air/fuel mixture.

It is still another object of the present invention to provide a fluid injection system of the above type which is inexpensive to manufacture and which is simple and reliable in operation.

It is a further object of the present invention to provide a fluid injection system of the above type which is easy to install on a supercharged internal combustion engine and which is suited for aftermarket installations on previously manufactured engines.

Towards the fulfillment of these and other objects, the system of the present invention includes a nozzle for receiving the fluid and a portion of said mixture and for injecting said fluid and said mixture into the carburetor at a rate proportional to the flow rate of said mixture. A supercharger receives the mixture from said carburetor and varies the pressure of the mixture in proportion to a predetermined demand on the engine before the mixture is introduced into the engine.

BRIEF DESCRIPTION OF THE DRAWINGS

The above brief description as well as further objects, features and advantages of the present invention will be more appreciated by reference to the following detailed description of presently preferred but nonetheless illustrative embodiments in accordance with the present invention, when taken in conjunction with the accompanying drawings wherein.

DESCRIPTION OF THE PREFERRED EMBODIMENT

Figure 1:
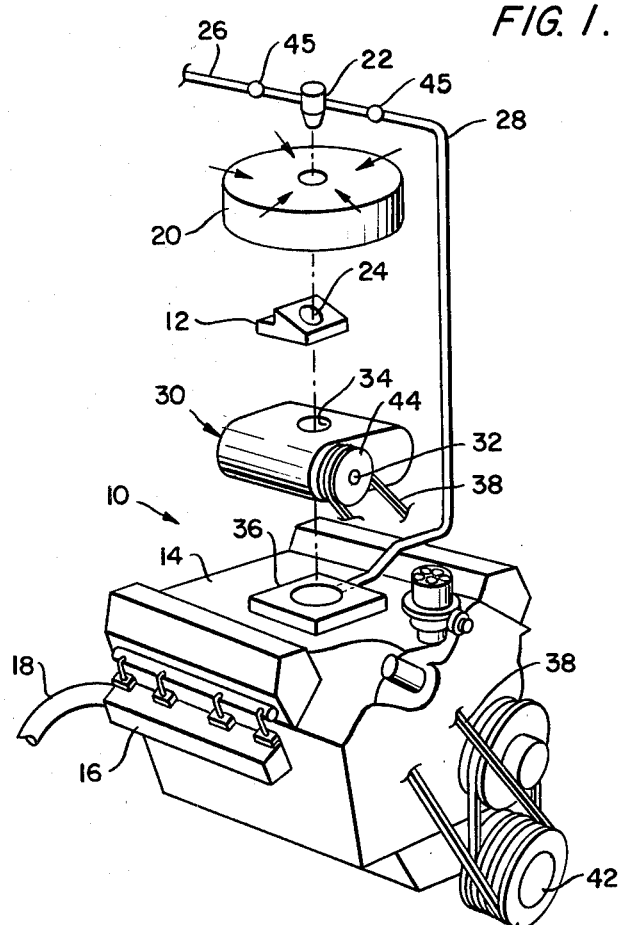
FIG. 1 is an exploded perspective view of an exemplary supercharged internal combustion engine equipped with the system of the present invention, with certain components being shown schematically and with selected parts of the engine being omitted in the interest of clarity.

An exemplary supercharged internal combustion engine incorporating the fluid injection system of the present invention is shown in FIG. 1 and is generally referred to by the reference in numeral 10. The engine 10 is of conventional design and includes a carburetor 12 which is mounted above an intake manifold 14 for introducing a fuel/air charge into the combustion chambers of the engine. An exhaust manifold 16 is provided on each side of the engine for receiving and directing the exhaust gases produced during the combustion process to a conduit 18 which is connected to the exhaust system (not shown) of the engine in a conventional manner. An air cleaner, or other plenum, 20 is mounted over the carburetor 12 and has an opening formed therein for receiving a fluid injection jet, or nozzle, 22 which is adapted to inject fluid, such as water or a water solution, into the intake air side of the engine 10. In the preferred embodiment, the nozzle 22 is mounted in the air cleaner 20 above an inlet opening 24 of the carburetor 12 to direct a downdardly diverging flow of finely divided fluid droplets into the intake air entering the opening 24 as shown by the flow arrows, and as will be described. It is understood that a source of fuel is connected to the carburetor 12 in a conventional manner, and is not shown in the interest of clarity.

The nozzle 22 is connected to a source of the fluid through a hose 26 in a manner also to be described, and is also connected, via a hose 28, to the outlet of a supercharger, shown in general by the reference numeral 30.

The supercharger 30 may be of a conventional design, such as a Roots-type blower, or the like, (not shown) which are driven by a drive shaft 32 and which operate to draw in the mixture of air and fuel from the carburetor 12 via an inlet 34. The air/fuel mixture passing through the supercharger 30 is discharged into the intake manifold 14 via an inlet fitting 36. The drive shaft 32 is driven by a positive drive belt 38 which connects, in a driving relationship, a drive pulley 40 connected to the drive shaft 42 of the engine and a driven pulley 44 connected to the shaft 32. The supercharger 30 is thus driven in direct proportion to the speed of the engine and, under certain conditions, operates to introduce a relatively large quantity of air at a relatively high pressure into the engine to increase the air charge weight and the power output of the engine. Since this type of arrangement is well known in the art, it will not be described in any further detail.

The aforementioned hose 28 is connected to the inlet fitting 36 and thus taps off a portion of the compressed air/fuel mixture from the supercharger 30 and introduces it to the nozzle 22. The amount of the air/fuel mixture that is tapped by the hose 28 is very samll (such as, for example, one-tenth of one percent) when compared to the volume of the mixture passing through the fitting 36 and into the intake manifold 14 and does not affect the basic operational parameters of the engine.

The aforementioned portion of the air/fuel mixture from the outlet of the supercharger 30 passing through the hose 28 to the nozzle 22 serves to induce the flow of fluid through the hose 26 and to the nozzle 22 for discharge into the carburetor 12 in a manner to be described. A valve 45 is provided in each of the hoses 26 and 28, to prevent any reverse flow of the fluid and the air/fuel mixture, respectively, from the nozzle 22.

Figure 2:
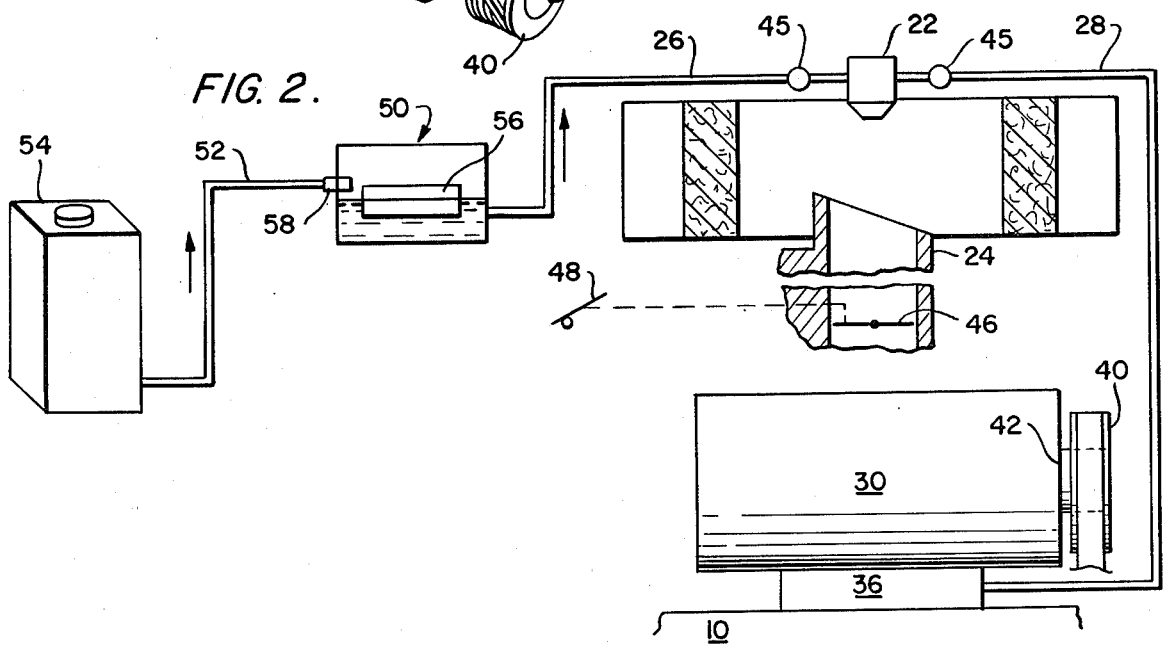
FIG. 2 is a schematic representation of a portion of the fluid injection system of FIG. 1.

As shown in FIG. 2, a throttle valve 46 is disposed in the throat of the carburetor 24 for varying the flow of the air/fuel mixture through the carburetor in response to the position of an accelerator pedal 48 which is mechanically connected to the throttle valve 46. It is understood that the carburetor 12, including the throttle valve 46 is of a conventional design with the exception that it is enlarged in size to accommodate the increased volume of air and fuel consistent with the operation of the supercharger 30, as will be described in detail later.

As also shown in FIG. 2, the hose 26 is connected to a float-bowl reservoir 50 which, in turn, is connected through a supply line 52 to a fluid container 54. The float-bowl reservoir 50 includes a float 56 that operates an inlet valve 58 which operates to maintain a constant level of cooling fluid in the reservoir 50 in a conventional manner. In the preferred embodiment, the fluid is in the form of water, or water solution with other substances, such as methanol, or other alcohols, and the container 54 is provided with a pump (not shown) for pumping the fluid to the reservoir 50. Also, the float 56 is located at a selected elevation below the elevation of the nozzle 22 to prevent the fluid from unintentionally flowing under the influence of gravity to and through the nozzle 22. The reservoir 50, while not necessary to the operation of the system of the present invention, permits the supply container 54 to be located remotely from the engine 10 at a convenient elevation relative to the nozzle 22.

Figure 3:
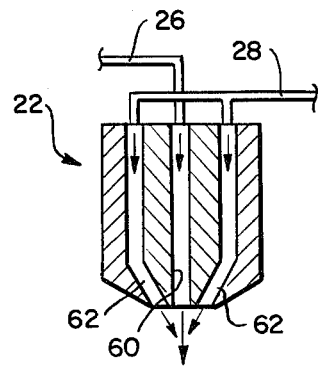
FIGS. 3 and 4 are cross-sectional views of two exemplary fluid injection nozzles suitable for use with the system of the present invention.
Figure 4:
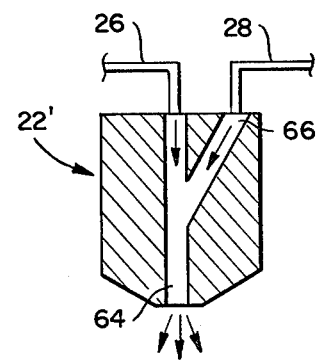

The nozzle 22 is adapted to provide a downwardly directed and preferably diverging flow of finely divided fluid droplets in response to the flow of air through the nozzle. While many different types of nozzles are suitable for use with the present invention, the nozzle 22 of the type shown in FIG. 3 is preferred which includes a central bore 60 for receiving the fluid from the hose 26 and a plurality of circumferentially arranged atomizing air supply bores 62 for receiving air from the hose 28 and for directing the flow of air to the outlet of the bore 60. The flow of air through the bores 62 and past the outlet of the bore 60 creates a low pressure zone which induces, or draws, fluid from the hose 26 through the bore 60 in a conventional manner, where it is mixed with, and atomized by, the air passing into the inlet 24 of the carburetor 12. In the alternative, a nozzle 22′ of the type shown in FIG. 4 may be provided which has a central bore 64 connected to the fluid supply hose 26 and an air-injection bore 66 connected to the air supply hose 28 and registering with the central bore 64 at an acute angle to effect the induction and atomizing function.

In operation, upon starting the engine, and therefore driving the shaft 32, via the drive shaft 42, the pulley 40, the belt 38, and the pulley 44, the supercharger 30 will be driven in response to engine speed. During normal operating conditions of the vehicle when the pressure in the intake manifold 14 is below atmospheric, the supercharger 30 exerts no influence on the mixture even though it is being driven in response to engine speed. Thus, the pressure and the resulting flow rate of the air/fuel mixture entering the intake manifold is substantially the same as when it left the carburetor 12, and there is no flow of the mixture to the nozzle 22, and no injection of water from the nozzle into the carburetor 12. When the demand on the engine 10, as manifested by the degree of openings of the throttle valve 46 and the speed of the engine, is increased to an extent that the pressure in the intake manifold 14 reaches atmospheric, the pressure and the flow rate of the air/fuel mixture is increased by the supercharger before being introduced to the intake manifold to increase the air charge weight and the power output of the engine. When the pressure in the intake manifold exceeds atmospheric, the hose 28 taps off a portion of the flow of the mixture from the supercharger 20 and introduces it to the nozzle 22, causing a proportional injection of water from the nozzle into the carburetor 12. As the demand on the engine increases, the pressure and flow rate of the mixture from the supercharger and through the hose and to the nozzle increases proportionally, causing a resultant proportional increase in the injection of water. This, plus the very precise metering of the fluid that is achieved by the system of the present invention due to the fact that the volume of the air/fuel mixture passing through the nozzle 22 is relatively high compared to the volume of the fluid, can result in a dramatic increase in engine efficiency.

With the proper use of the system, pre-ignition and detonation are substantially eliminated since the fluid lowers the combustion temperatures below the point where they normally occur. Also, the production of nitrous oxides are reduced because of the lower operating temperatures. Further, the small fluid droplets produced by the system of the present invention are so minute as to eliminate cool spots of unburned gas and therefore do not cause a rise in exhaust emissions of hydrocarbon and carbon monoxide. In addition, the minute size of the drops does not cause corrosion nor otherwise damage the impeller blades of the supercharger as do other liquid fluid injection systems.

While the preferred embodiment of the fluid injection system of the present invention has been shown in combination with the engine illustrated in FIG. 1, as will be apparent to those skilled in the art, the fluid injection system can be applied to any one of a plurality of different types of engines including 4-cylinder, 6-cylinder and V-8 engines. Also, although reference has been made to the terms "cooling fluid", "water", and "water in solution", it is understood that other types of fluids can be injected that affects the combustion process, such as octane improvers, anti-detonates, and oxygen additives, etc.

Still other variations in the foregoing can be made within the scope of the invention. For example, although reference is made to the use of conduits to connect the various components in fluid flow communication, it is understood that tubing, pipes, hoses, etc. can be used. Also, the supercharger 30 can be driven by means other than the aforementioned belt-pulley system. Further, a demand regulator, or the like can be provided in place of the float-bowl reservoir 100 to provide the fluid to the hose 26, and the position and location of the nozzle 22 can be varied as long as it is effective to introduce the fluid into the intake air side of the engine 10.

It will be apparent that the system of the present invention can be used on compression ignition (diesel) engines as well as gasoline engines using various forms of fuel injection, etc.

As also will be apparent from those skilled in the art, still other changes and modifications may be made to the water injection system of the present invention without departing from the spirit and scope of the invention and as recited in the appended claims and their legal equivalent.

What is claimed is:

1. A system for injecting fluid into an internal combustion engine, said system comprising means for supplying an air/fuel mixture to said engine, means in a responsive relation to the output of said engine for receiving said mixture from said supplying means and pressurizing said mixture in proportion to the demand on said engine, and flow passage means connected to a source of said fluid and to said pressurizing means for receiving said fluid and said mixture, said flow passage means being formed and arranged to draw said fluid from said source in response to the flow of said mixture and inject said fluid into said supplying means at a rate proportional to the pressure of said mixture.

2. The system of claim 1 wherein said pressurizing means pressurizes said mixture only after the demand on said engine exceeds a predetermined value.

3. The system of claim 1 wherein said fluid and said mixture are injected into said supplying means.

4. The system of claim 2 wherein said pressurizing means increases the pressure of said mixture in proportion to increases in demand on said engine above said predetermined value.

5. The system of claim 4 wherein said proportional increases in said pressure causes a corresponding proportional increase in the injection of said fluid.

6. The system of claim 1 wherein said pressurizing means comprises a supercharger drivingly connected to the output shaft of said engine.

7. The system of claim 1 wherein said supplying means comprises a throttle valve for varying the air/fuel mixture supplied to said pressurizing means in response to position of the accelerator pedal associated with said engine.

8. The system of claim 7 wherein said supplying means is a carburetor including said throttle valve.

9. The system of claim 2 wherein said pressurizing means operates in response to the pressure in the intake manifold of said engine equaling or exceeding atmosphere.

10. The system of claim 9 further comprising means connecting the outlet of said pressurizing means to the intake manifold of said engine.

11. The system of claim 10 further comprising means connected to said connecting means for tapping off a portion of said mixture and supplying said portion to said flow passage means.

12. The system of claim 1 wherein said flow passage means is in the form of a nozzle.

13. The system of claim 12 wherein said flow passage means comprises a fluid flow passage and at least one mixture flow passage, said passages being formed and arranged to mix said fluid and mixture upon their discharge from said nozzle.

* * * * *